US012051015B2

(12) United States Patent
Persia et al.

(10) Patent No.: US 12,051,015 B2
(45) Date of Patent: Jul. 30, 2024

(54) ARTIFICIAL INTELLIGENCE MODEL INTEGRATION AND DEPLOYMENT FOR PROVIDING A SERVICE

(71) Applicant: Accenture Global Solutions Limited, Dublin (IE)

(72) Inventors: Giovanni Persia, Rome (IT); Emanuele Baldassarre, Bari (IT); Emilio Paterlini, Cisterna di Latina (IT); Andrea Valle, Maenza (IT); Mario Vece, Battipaglia (IT); Pietro Rosa, Rome (IT); Alessio Rocco, Latina (IT)

(73) Assignee: Accenture Global Solutions Limited, Dublin (IE)

( * ) Notice: Subject to any disclaimer, the term of this patent is extended or adjusted under 35 U.S.C. 154(b) by 211 days.

(21) Appl. No.: 17/301,600

(22) Filed: Apr. 8, 2021

(65) Prior Publication Data
US 2022/0327442 A1  Oct. 13, 2022

(51) Int. Cl.
*G06Q 10/0631* (2023.01)
*G06F 16/2455* (2019.01)
(Continued)

(52) U.S. Cl.
CPC ... *G06Q 10/0631* (2013.01); *G06F 16/24568* (2019.01); *G06N 5/04* (2013.01); *G06N 20/00* (2019.01)

(58) Field of Classification Search
CPC ......... G06Q 10/0631; G06F 16/24568; G06N 5/04; G06N 20/00; H04W 4/40;
(Continued)

(56) References Cited

U.S. PATENT DOCUMENTS 7,135,991 B2 * 11/2006 Slemmer .................. G08G 1/14
705/13
9,773,413 B1 * 9/2017 Li .......................... G08G 1/146
(Continued)

OTHER PUBLICATIONS

Bura Harshitha, An Edge Based Smart Parking Solution Using Camera Networks and Deep Learning. 2018 IEEE International Conference on Cognitive Computing (ICCC), IEEE Jul. 2, 2018 (Jul. 2, 2018), pp. 17-24, XP 033399963, DOI: 10.1109/ICCC.2018.000010 (Year: 2018).*

(Continued)

*Primary Examiner* — Dylan C White
(74) *Attorney, Agent, or Firm* — Polsinelli PC

(57) ABSTRACT

In some implementations, a system may receive, from an analysis system, a data stream associated with monitoring an environment. The system may process, using a first model, the data stream to detect an object associated with a service provided by an application. The system may analyze a monitoring configuration of the analysis system. The system may determine, based on processing the data stream, service data associated with providing the service in association with the object. The system may configure, based on the monitoring configuration, an edge device to access the data stream and host a second model to process the service data according to the data stream. The system may receive, from the edge device, a service output associated with providing the service in association with the object. The system may perform an action associated with the service output and the object.

27 Claims, 9 Drawing Sheets

(51) Int. Cl.
*G06N 5/04* (2023.01)
*G06N 20/00* (2019.01)

(58) Field of Classification Search
CPC ..... H04W 4/029; G06V 20/59; G06V 20/625; G06V 20/586
See application file for complete search history.

(56) References Cited

U.S. PATENT DOCUMENTS

| | | | | |
|---|---|---|---|---|
| 10,157,543 | B1* | 12/2018 | Shah | G08G 1/04 |
| 10,460,255 | B2* | 10/2019 | Nagaraju | H04L 43/0817 |
| 11,785,873 | B2* | 10/2023 | Sibley | G06Q 50/02 |
| | | | | 701/50 |
| 11,900,702 | B2* | 2/2024 | DeSantola | G06V 20/64 |
| 2013/0258107 | A1* | 10/2013 | Delibaltov | G08G 1/065 |
| | | | | 348/148 |
| 2014/0266801 | A1* | 9/2014 | Uppal | G08G 1/0133 |
| | | | | 340/932.2 |
| 2017/0219361 | A1* | 8/2017 | Mays | G08G 1/207 |
| 2018/0032915 | A1* | 2/2018 | Nagaraju | G06V 10/94 |
| 2020/0012966 | A1* | 1/2020 | Nagaraju | H04L 43/0817 |
| 2021/0035313 | A1* | 2/2021 | Ghadyali | G06T 7/246 |
| 2022/0238012 | A1* | 7/2022 | Ghadiok | G08G 1/0175 |
| 2022/0327371 | A1* | 10/2022 | Ozcan | G02B 27/4277 |
| 2022/0327442 | A1* | 10/2022 | Persia | G06N 20/00 |
| 2022/0406195 | A1* | 12/2022 | Janakiraman | G08G 5/0026 |
| 2023/0222132 | A1* | 7/2023 | Cella | G06F 16/24552 |
| | | | | 707/770 |
| 2023/0300195 | A1* | 9/2023 | Sharma | G06F 18/251 |
| | | | | 706/12 |

OTHER PUBLICATIONS

Kum, Seungwoo; Artificial Intelligence Service Architecture for Edge Device; Nov. 9, 2020; IEEE (Year: 2020).*

Calo, Seraphin B.; Edge Computing Architecture for applying AI to IoT; Dec. 1, 2017; 2017 IEEE International Conference on Big Data; IEEE Xplore (Year: 2017).*

Alalouff R., "Edge-based Video Surveillance: The Pros and Cons," IFSECGlobal, Sep. 2, 2020, pp. 1-5, XP055940247, Retrieved from the Internet: [URL: https://www.ifsecglobal.com/video-surveillance/edge-based-video-surveillance-the -pros-and-cons/] [retrieved on Jul. 8, 2022].

Bura et al., "An Edge Based Smart Parking Solution Using Camera Networks and Deep Learning," 2018 IEEE International Conference on Cognitive Computing, Jul. 2, 2018, pp. 17-24, XP033399963, [retrieved on Sep. 7, 2018].

Extended European Search Report for Application No. EP22164625.0, mailed on Jul. 18, 2022, 12 pages.

* cited by examiner

ARTIFICIAL INTELLIGENCE MODEL INTEGRATION AND DEPLOYMENT FOR PROVIDING A SERVICE

BACKGROUND

Through advanced, human-like intelligence (e.g., provided by software and hardware), an artificial intelligence model can mimic human behavior or perform tasks as if the artificial intelligence model were human. Machine learning is an approach, or a subset, of artificial intelligence with an emphasis on learning rather than just computer programming. In machine learning, a device utilizes complex models to analyze a massive amount of data, recognize patterns among the data, and make a prediction without requiring a person to program specific instructions.

SUMMARY

In some implementations, a method includes receiving, from an analysis system, a data stream associated with monitoring an environment; processing, using a first model, the data stream to detect an object associated with providing a service, wherein the first model is trained according to first historical data that is associated with the analysis system analyzing the environment; determining, based on processing the data stream, service data associated with providing the service in association with the object; providing, to an application management system, a processing request to process the service data using a second model, wherein the second model is trained based on historical outputs associated with the first model and based on second historical data that is associated with providing the service; receiving, from the application management system, a service output associated with providing the service in association with the object; and performing an action associated with the service output and the object.

In some implementations, a device includes one or more memories and one or more processors, communicatively coupled to the one or more memories, configured to: receive a service request to provide a service associated with an event in an environment; analyze a monitoring configuration of an analysis system that monitors the environment and that provides a data stream associated with providing the service; determine a first set of parameters for performing a first task associated with providing the service; select, based on the first set of parameters and the monitoring configuration, a first device to host a first model that is configured to perform the first task based on a first portion of the data stream; cause the first device to host the first model and access the data stream in association with providing the service; determine a second set of parameters for performing a second task associated with providing the service; configure, based on the second set of parameters and the monitoring configuration, a second model to perform the second task; access, from the analysis system, the data stream; and perform an action associated with providing the service based on service data received from the first model or the data stream.

In some implementations, a non-transitory computer-readable medium storing a set of instructions includes one or more instructions that, when executed by one or more processors of a device, cause the device to: receive, from an analysis system, a data stream associated with analyzing a physical environment; process, using a first model, the data stream to detect an object associated with a service provided by an application; analyze a monitoring configuration of the analysis system; determine, based on processing the data stream, service data associated with providing the service in association with the object; configure, based on the monitoring configuration, an edge device to access the data stream and host a second model to process the service data according to the data stream; receive, from the edge device, a service output associated with providing the service in association with the object; and perform an action associated with the service output and the object.

In some implementations, a system for monitoring a physical environment may include an application management system; a first edge device configured to receive first real-time data, and transmit the first real-time data to the application management system, wherein the application management system is configured to process the first real-time data using a first artificial intelligence (AI) model to generate first output data; and a second edge device configured to: receive a second real-time data, process, using a second AI model, the second real-time data to generate second output data, and transmit the second output data to the application management system, wherein the application management system is configured to perform an action based on the first output data or the second output data.

DETAILED DESCRIPTION

Figure 1A:
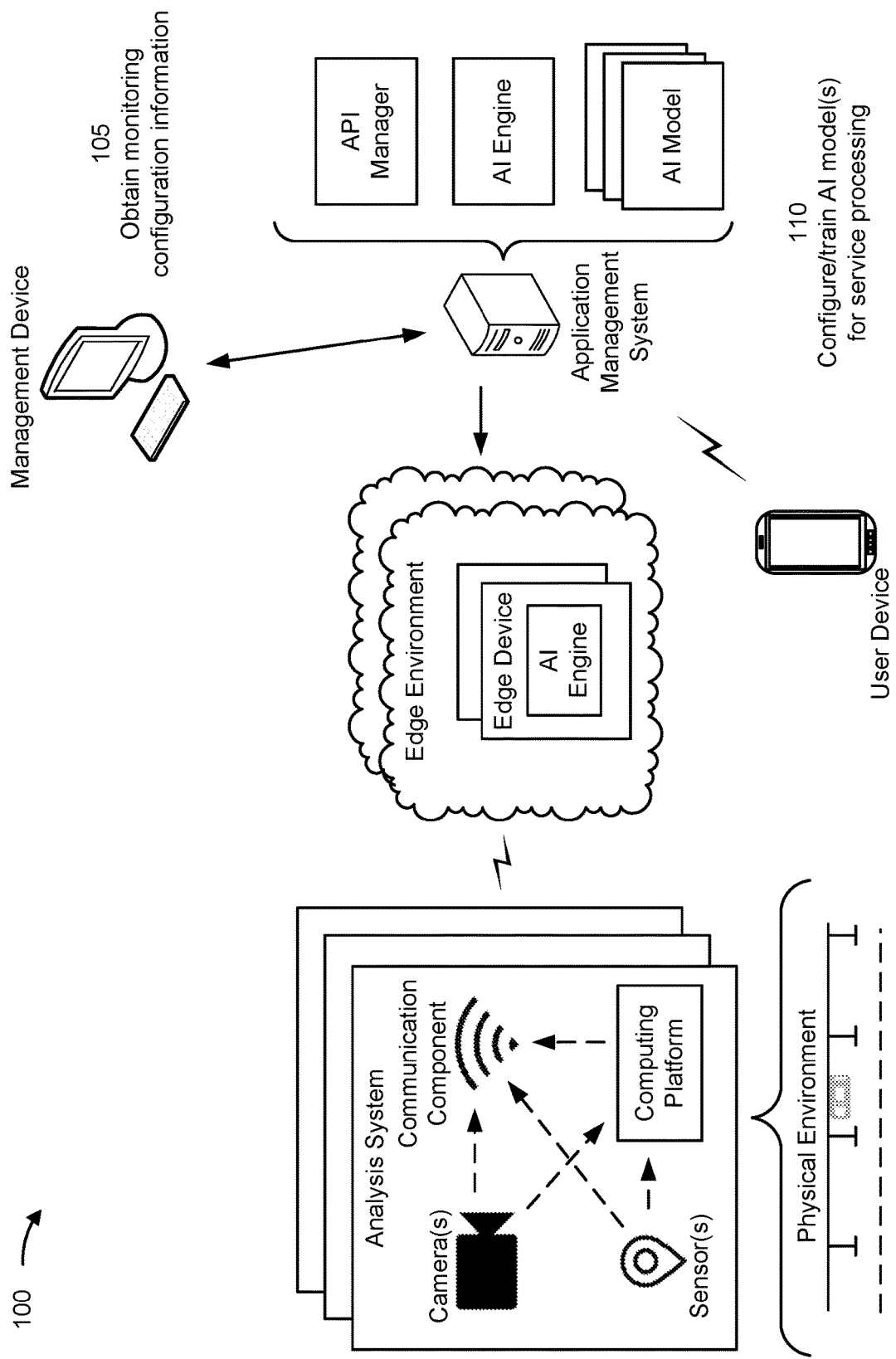
FIGS. 1A-1C are diagrams of an example implementation described herein.

The following detailed description of example implementations refers to the accompanying drawings. The same reference numbers in different drawings may identify the same or similar elements.

In many instances, an analysis system may include one or more computing devices, one or more sensors, one or more cameras (or other types of monitoring sensors) and/or one or more controllers for analyzing an environment (e.g., a computing environment and/or a physical environment). The analysis system may be configured to detect and/or track activity associated with one or more objects in the environment and/or one or more operations associated with the environment. Depending on a complexity of a service that is to be provided in association with analyzing the environment, the analysis system may include a communication device to permit the analysis system to provide a data stream to a remote system that is configured to provide the service. The service may be associated with an application and/or provided using the application. The complexity of the service may be defined according to an amount of computing resources that are required to perform the service and/or one or more constraints associated with a service level agreement for providing the service.

Accordingly, if a configuration or capability of the analysis system is locally insufficient to provide a service (e.g., due to insufficient resources or computing capabilities), the analysis system may provide the data stream to a remote system (e.g., an edge-based system and/or a cloud-based system) that has the capability to provide relatively more complex services. However, such remote systems may also be configured with various types of resources and/or with different capabilities.

Some implementations described herein provide an application management system that is configured to integrate one or more artificial intelligence (AI) models within one or more computing environments to provide a service associated with an analysis system. For example, the application management system may select and/or deploy individual AI models to various network devices of an architecture and integrate the AI models with one another to provide a service (e.g., a monitoring service associated with the analysis system). The application management system may select and/or deploy one or more functions of an application to respective network devices to balance performance of the service (e.g., according to service level agreement constraints) and consumption of resources of the network devices, as described herein. For example, the one or more functions may include one or more rule processing functions, one or more data processing functions, and/or one or more analytics functions. In some implementations, the one or more functions may include one or more AI models that are trained to performed one or more tasks (e.g., based on historical data associated with the environment of the analysis system). The application management system may determine and/or identify a monitoring configuration associated with the analysis system (e.g., a configuration of devices and/or network devices in an architecture configured to provide the service) and/or parameters for performing one or more tasks for providing the service (e.g., via the one or more functions). Based on the monitoring configuration and/or parameters for the tasks, the application management system may configure devices (e.g., computing devices and/or network devices) of the architecture to host one or more corresponding functions to perform the individual tasks of the service.

In some implementations described herein, the application management system may deploy and/or integrate the functions dynamically based on detecting individual instances for providing the service. For example, based on detecting an event from a data stream of an analysis system (e.g., an event that triggers providing a service in association with an object involved in the event), the application management system may cause certain network devices (e.g., edge devices and/or cloud-based devices associated with the application management system) to host certain functions for processing the data stream to provide the service. As a more specific example, the application management system may cause the network devices to host one or more AI models that are trained to perform one or more tasks of the service.

Accordingly, the application management system may enable split processing between cloud-computing environments to enable a dynamic allocation of tasks of a service (or an application) to be split between devices of an architecture. For example, the application management system may split tasks of the service between devices of multiple edge environments and/or between a device of an edge environment and a device of a backend environment that includes the application management system. Therefore, some implementations described herein may enable computing resources and/or network resources to be conserved in association with providing a service associated with an environment of an analysis system. For example, the application management system may offload a task of a service (e.g., by deploying an AI model associated with the task) to an edge device of an edge environment to permit the application management system to conserve resources that would otherwise be consumed by the application management system performing the task. For example, such resources may include computing resources (e.g., processing resources and/or memory resources) of the application management system, and/or network resources (e.g., communication resources of network devices) of a network that are between the edge device and the application management system. Furthermore, the application management system may offload the task to improve performance of providing the service (e.g., improve latency and/or a speed associated with providing the service) by taking advantage of the edge device being nearer the analysis system than the application management system.

Additionally, or alternatively, the application management system may host certain AI models to conserve computing resources of the edge device (e.g., to avoid overloading the edge device) and/or to permit the service to be performed in the event that the edge device is incapable of providing the service (e.g., due to the monitoring configuration, due to the edge device having insufficient resources, and/or due to the edge device not hosting an AI model for performing the task, among other examples). In this way, the application management system may improve robustness with respect to providing a service by enabling various devices and/or various computing environments to dynamically host AI models that are capable of providing the service.

Figure 1B:
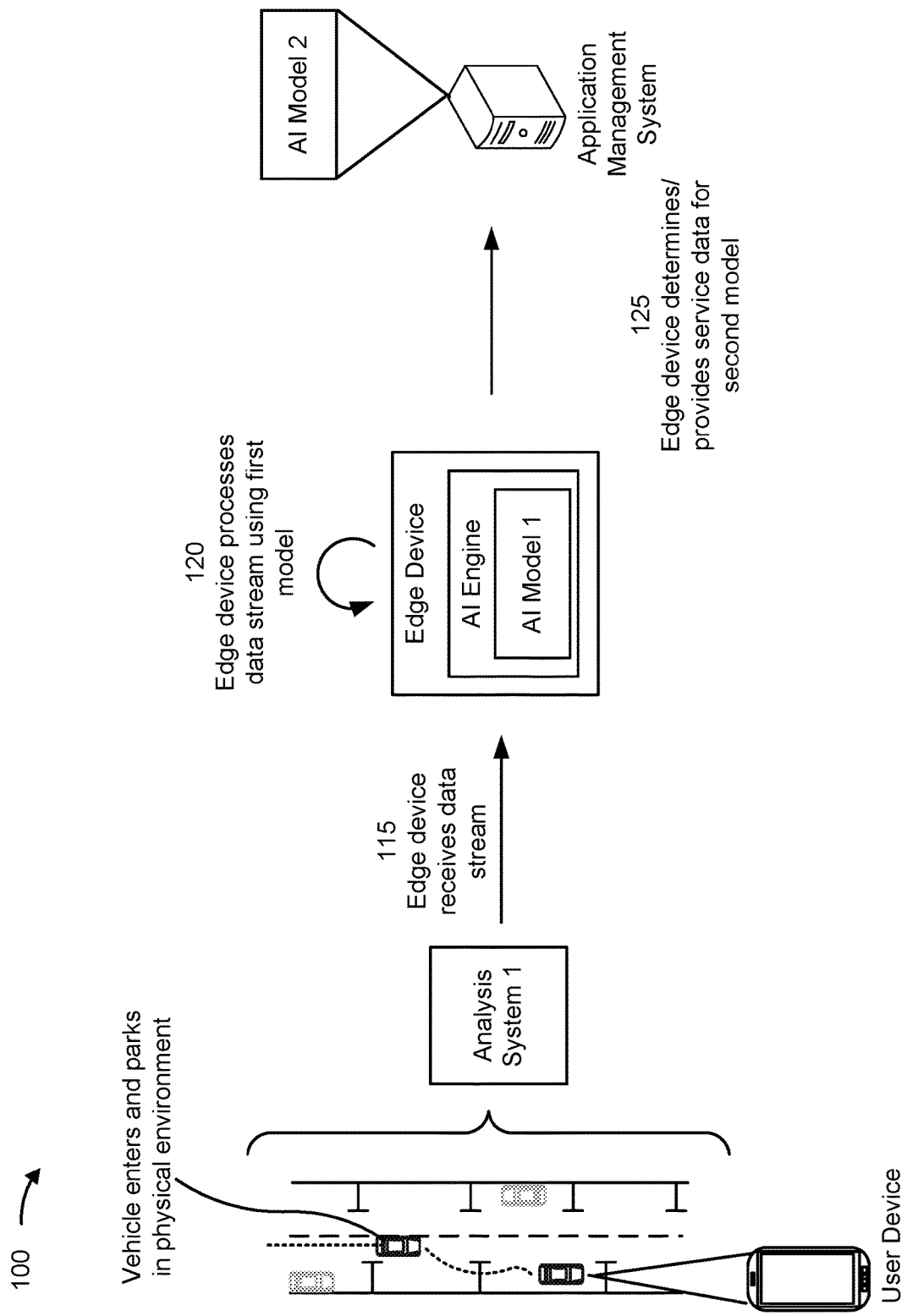
Figure 1C:
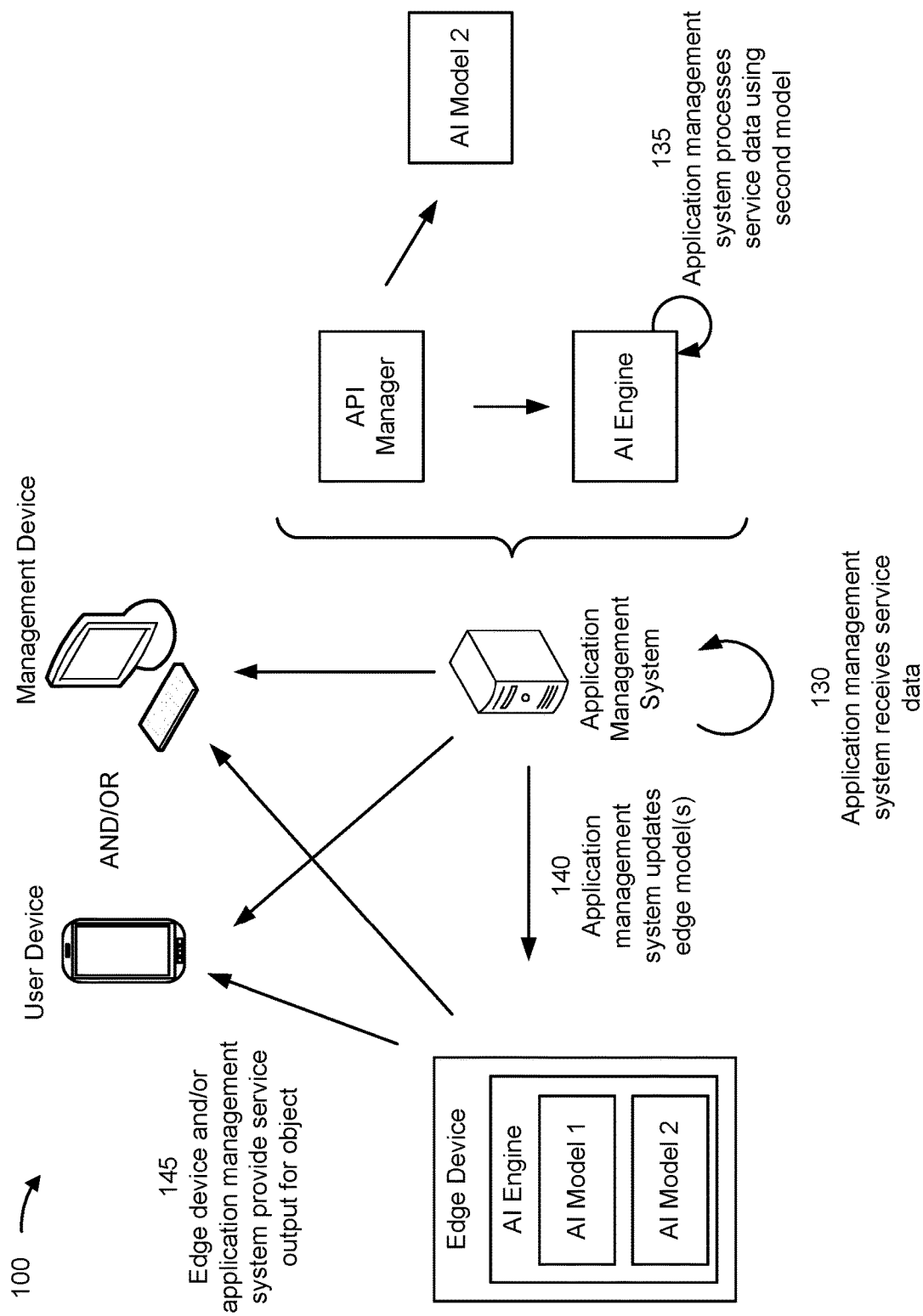

FIGS. 1A-1C are diagrams of an example implementation 100 associated with integrating and/or deploying one or more artificial intelligence models to provide a service. As shown in FIGS. 1A-1C, example implementation 100 includes a user device, a management device, one or more analysis systems configured to analyze an environment, one or more edge environments that include one or more edge devices, and an application management system that includes an application programming interface (API) manager, an AI engine, and one or more AI models. As shown, the edge device(s) may include an AI engine. The AI engines of the edge device and/or the application management system may include one or more components that are configured to host and/or execute an AI model described herein. These devices are described in more detail below in connection with FIG. 5 and FIG. 6.

An architecture, as used herein, may include one or more systems and/or one or more devices (e.g., one or more analysis systems, one or more edge devices of one or more edge environments and/or network devices of a network associated with the architecture) that are available to provide a service described herein. Accordingly, the architecture may include a configuration of systems, devices, and/or a topology of a network formed by communication links between the systems and/or devices. In some implementations, the architecture may be associated with a smart city infrastructure that includes one or more analysis systems (e.g., that provide real-time data) and/or one or more edge devices (e.g., that process the real-time data using one or more AI models and/or that provide output data associated with the AI models to the application management system).

A service, as described herein, may be associated with an application that is configured to perform one or more tasks to provide the service using the architecture. The application may be installed and/or hosted on the user device to provide the service to a user of the user device. For example, the service may be provided in association with an account of the user (e.g., a user account associated with a user of the user device). Furthermore, the application management system may be associated with a backend system (or platform) of the application that is owned and/or operated by an entity, such as an enterprise or individual that is to provide the service for the user using the analysis system and/or the network architecture of example implementation 100.

In example implementation 100, the environment is shown as a physical environment that includes a parking area of a street, though examples described herein may similarly apply in connection with monitoring or providing a service for another type of parking area (e.g., a parking lot, and/or a parking structure), for a computing environment (e.g., a datacenter, a computing network, a cloud-based environment, and/or an application environment, among other examples) and/or another type of physical environment (e.g., a monitored room of a building, a monitored area of a campus, and/or a monitored area of a governed jurisdiction, among other examples). Accordingly, a user in example implementation 100 may correspond to a driver (or passenger) of a vehicle. The physical environment (e.g., the parking area and/or the street) may be associated with a smart city infrastructure that is monitored by a system, as described herein. Further, while a service may be described in connection with certain detected events and/or certain monitored objects (e.g., vehicles or individuals) within the parking area, examples described herein may similarly apply for other applications and/or other types of services corresponding to other monitored objects and/or other types of users (e.g., pedestrians in a roadway environment, customers within a retail environment or merchant environment, and/or employers in an environment of an organization, among other examples) in other types of physical environments.

An analysis system, as shown, may include one or more cameras, one or more sensors, and/or a communication component. In some implementations, the analysis system may include a controller or central processing unit for controlling devices of the analysis system to generate a data stream, as described herein, and/or provide the data stream or other information, as described herein. A camera of the analysis system may include any suitable camera for capturing images and/or generating image data depicting the physical environment, such as a security camera, a close-circuit television (CCTV) camera, an infrared camera, a thermal-imaging camera, and/or a web-camera, among other examples. A sensor of the analysis system may include any suitable sensor for detecting a characteristic of the physical environment and/or determining a characteristic of an object of the environment (e.g., a motion detection sensor for detecting motion of a vehicle or individual in the physical environment, microphone for detecting sound in the environment, a speed sensor for detecting speed of a vehicle in the physical environment, a temperature sensor for detecting a temperature in the environment, a weather sensor for identifying weather conditions in the physical environment, a locationing sensor for determining a location of a vehicle or individual in the physical environment, and/or an occupancy sensor for determining an occupancy of a parking space or other location of the physical environment, among other examples). The data stream, as described herein, may include real-time data, and such real-time data may include or indicate one or more of image data (and/or video data) from a camera, audio data, location data, sensed environment data, and/or weather data. The communication component may include any suitable wired or wireless communication interface that permits the analysis system to communicate with the edge devices and/or the application management system (e.g., via several different communication protocols).

As shown in FIG. 1A, and by reference number 105, the application management system obtains monitoring configuration information. The application management system may receive the monitoring configuration information from an analysis system and/or an edge device based on being communicatively coupled to the analysis system and/or the edge device.

In some implementations, the application management system may obtain the monitoring configuration information based on receiving a service request that identifies that the service is to be provided. For example, the application management system may receive a service request from the user device in connection with the application management system providing a service to a user of the user device. Additionally, or alternatively, the application management system may receive the service request from the management device in connection with the application management system providing the service for the user and/or in connection with providing a service for an entity associated with the physical environment (e.g., an organization that provides or monitors parking in the parking area). In some implementations, the application management system may receive the monitoring configuration information from the management device. For example, the management device may indicate the monitoring configuration information based on a user input from the entity.

The monitoring configuration information may include system information associated with characteristics of an analysis system of the physical environment. The system information may identify information associated with the devices or components of the analysis system in the physical environment. For example, the system information may identify a characteristic of a camera of the analysis system (e.g., a type of image capture capability of the camera, a resolution of image data captured by the camera, and/or a frame rate of frames of video captured by the camera (e.g., using a camera protocol, such as an Open Network Video Interface Forum (ONVIF) protocol and/or a Physical Security Interoperability Alliance (PSIA) protocol), a type of a sensor of an analysis system, a location of a device (e.g., a camera, a sensor, and/or a communication component) of the analysis system, and/or a capability of the analysis system. Additionally, or alternatively, the system information may indicate characteristics of a data stream provided by the analysis system. For example, the one or more characteristics of the data stream may include a resolution of image data in the data stream, a type of data included in the data stream, a source of data included in the data stream, a location of the source of the data, and/or the like. In some implementations, the monitoring configuration information may include architecture information that identifies an architecture of the application management system and the analysis system.

The monitoring configuration information may include edge environment information associated with the edge device(s) of the architecture. For example, the monitoring configuration information may indicate that an edge device is a private edge device and/or a public edge device. A private edge device may be associated with a private edge environment (e.g., a private cloud network) that is owned and/or operated by an entity, such as an entity that owns and/or operates one or more of the analysis systems and/or the physical environment. In such a case, the monitoring configuration information may indicate whether the private edge device is a certain type of edge device (e.g., a private edge server device and/or other type of computing device of an edge environment), whether the private edge device has certain processing capabilities (e.g., based on a type of available resources and/or a configuration of available resources), and/or has certain custom allocations of resources for performing one or more tasks of the service (e.g., because the private edge device may be configurable by an entity that is associated with the analysis system(s)). Additionally, or alternatively, the monitoring configuration information may indicate that a public edge device is a certain type of device (e.g., an edge gateway, a router, a switch, or other type of network device of a public edge network or edge gateway network) and/or whether the public edge device is capable of hosting an AI model to perform one or more tasks of a service, as described herein.

Accordingly, as described herein, the application management system may obtain monitoring configuration information that permits the application management system to configure and/or train one or more AI models to perform individual tasks associated with providing a service.

As further shown in FIG. 1, and by reference number 110, the application management system may configure and/or train one or more AI models for service processing. For example, the application management system may configure the one or more AI models for service processing by selecting and/or deploying certain AI models to one or more of the edge devices (e.g., to cause the one or more edge devices to host the AI models and/or use AI engines of the edge devices to execute the AI models) and/or configuring the one or more AI models to be hosted by the application management system (e.g., and/or executed by the AI engine of the application management system).

The application management system may include and/or have access to a plurality of AI models and/or types of AI models that are configured to operate and/or perform various tasks associated with a service. In some implementations, some AI models may be relatively more complex than other AI models and may, correspondingly, require more computing resources to process data (e.g., image data from the data stream) than other AI models. For example, a more complex AI model may be able to identify more detailed information and/or objects from image data than a relatively less complex AI model. In such cases, the application management system may configure the relatively more complex AI models to be hosted by a computing device with relatively more processing resources (e.g., the application management system and/or a private edge device, such as a network device of a private cloud network) than other devices (e.g., one or more of the edge devices, such as a public edge device or network device of an edge gateway network).

As described herein, one or more AI techniques (e.g., machine learning, deep learning, neural networks, and/or other types of AI models) can be used to provide a service associated with an application. In some implementations, one or more AI models may use a computer vision technique, such as a convolutional neural network technique, to assist in classifying image data into a particular class (e.g., image data from a camera of an analysis system). Such image data may include representations of various objects that are to be detected and/or identified in a monitored environment, such as vehicles, individuals (or other types of vulnerable roadside units (VRUs)), and/or other objects that may be of interest for providing a particular service in association with monitoring the environment. More specifically, the one or more AI models may determine that an object has a particular characteristic (e.g., is a particular type, is marked with and/or includes an identifier, and/or is located in a particular area of a monitored environment, such as within a threshold distance of another object that is being monitored). On the other hand, the one or more AI models may determine that an identified object does not have a particular characteristic and/or that such a characteristic cannot be identified from image data associated with the object.

In some implementations, the one or more AI models may be configured to analyze image data to determine whether an object depicted in the image data is associated with another object in the image data. For example, one or more AI models may determine that an individual is associated with a vehicle based on determining that the individual is depicted, in the image data, inside of the vehicle. In such a case, the one or more AI models may determine that the individual is a driver and/or passenger of the vehicle. As another example, an individual may be associated with the vehicle based on the individual being within a threshold distance (e.g., within one meter or two meters) of the vehicle for a threshold period of time. In such a case, the one or more AI models may determine that the individual may be involved in suspicious activity involving the vehicle (e.g., in order to alert the analysis system or owner of the vehicle of the suspicious activity).

In some implementations, a computer vision technique used by one or more AI models described herein may include an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, a cascade classification technique (e.g., a Haar cascade technique, a boosted cascade, a local binary pattern technique, and/or the like), and/or the like), an edge detection technique, an object in motion technique (e.g., an optical flow framework, a bounding box tracking technique, such as a Kalman filtering technique, among other examples of tracking an object in motion), and/or the like.

In some implementations, in order to determine a configuration, deployment, and/or integration of one or more AI models within the architecture for performing a service, the application management system may analyze a monitoring configuration of the analysis system (e.g., the analysis system that monitors the physical environment and/or that provides the data stream associated with providing the service). For example, the application management system may identify or determine one or more locations (e.g., physical locations and/or network locations) of the cameras of the analysis system (e.g., relative to the edge devices and/or to the application management system), types of cameras of the analysis system, resolutions of cameras, and/or the like. Additionally, or alternatively, the application management system may determine constraints associated with providing the service. For example, the application management system may determine service level agreement constraints associated with providing the service. Such a service level agreement may be between an enterprise that owns or operates the application and a service provider configured to provide the service to the user of the user device. One or more constraints of a service level agreement may include a speed constraint (e.g., a minimum data rate or maximum data rate), a latency constraint (e.g., a minimum latency or maximum latency), a reliability constraint (e.g., a minimum error rate and/or a maximum error rate), and/or the like.

Accordingly, the application management system may determine a set of parameters (which may be referred to herein as a "first set of parameters") for performing a task (which may be referred to as a "first task") associated with providing the service. Based on the set of parameters and/or the monitoring configuration, the application management system may select an edge device (which may be referred to herein as a "first device") to host a particular AI model (which may be referred to herein as a "first model"). For example, the application management system may select the edge device to host the first model to detect an event (e.g., an event that triggers the application management system to provide the service) based on detecting and/or identifying an object in the physical environment via the data stream.

As a more specific example, the first set of parameters may correspond to detection and/or identification of a vehicle (e.g., a particular type of vehicle, a vehicle that includes an identifier, such as a license plate number, and/or the like). In such a case, the application management system may configure an edge device to host the first model (shown as AI model 1 in FIG. 1B) to detect and/or identify a vehicle in association with providing a service associated with the vehicle (e.g., for a user of the vehicle) and/or in association with providing the service for an entity based on the vehicle being detected and/or identified in the physical environment. In some implementations, the first model may be configured to identify an identifier of an object in a video stream of the data stream. For example, the first model may be configured to identify and/or obtain an identifier from an object, such as a license plate number of a vehicle. In some implementations, the identifier is mapped to and/or associated with a user and/or an account of a user (e.g., the license plate number of the vehicle may be maintained by the application in association with the account of the user).

The application management system and/or an AI model associated with the application management system may be dynamically and/or flexibly executed in various locations (and/or by various devices) in order to optimize execution of the AI model and/or usage of the AI model (e.g., as determined by an optimization model and/or technique). In some implementations, the application management system may select the edge device, from a plurality of edge devices, based on a location of the analysis system or a location of the user device. For example, based on the edge device being a nearest edge device and/or within an edge network that is physically nearest the analysis system (e.g., as a private edge device and/or as an edge gateway), the application management system may select the edge device to host the first model to detect and/or identify the vehicle. In some implementations, the application management system, when configuring or deploying the first model to the edge device, may cause the edge device to access the data stream to permit the first model to process data from the data stream in accordance with the first task of the service.

In some implementations, the application management system is to configure another AI model to perform another task (which may be referred to herein as a "second task") associated with providing the service. For example, in such a case, the application management system may determine another set of parameters (e.g., a "second set of parameters") associated with performing the second task, and, based on the second set of parameters, configure another model (which may be referred to herein as a "second model") to perform the second task. More specifically, the application management system may configure the second model to perform the second task by instantiating or allocating resources of the application management system to host the second model to perform the second task. As an example, the second task may involve a more detailed analysis of image data of the data stream. Accordingly, the second model may correspond to an AI model that is configured to identify objects based on more complex features of the objects. For example, the second model may be configured to determine a status of the object in association with providing the service. More specifically, the second model may analyze more complex features of the object than the first model, thereby requiring more compute intensive process for identifying an object. More specifically, the second model may require an analysis of more image data (e.g., image data at a higher resolution) and/or detection of more complex features of an object. For example, while a first model may be capable of detecting a vehicle, the second model may be capable of identifying an individual inside the vehicle and/or an individual near the vehicle (e.g., because the first model can identify a vehicle with fewer reference points or lower resolution than are required for the second model to identify an individual within the vehicle).

In some implementations, the first model and/or the second model may be trained according to one or more sets of historical data. For example, the application management system may cause the first model to be trained based on first historical data that is associated with (e.g., specific to) one or more of the analysis systems monitoring the physical environment. In this way, the first model may be locally trained (e.g., according to local feature data) to identify one or more objects and/or characteristics of the one or more objects that are associated with the physical environment. In this way, the first model may be more optimally configured to identify objects that are likely to be within the physical environment according to specific configurations of the analysis system of the physical environment.

The second model may include one or more AI models that are trained to process the service data to determine a status of the object (e.g., the vehicle) in association with providing the service. In some implementations, the second model is trained based on second historical data that is associated with one or more historical outputs of the first model. In some implementations, the second historical data may correspond to a global data set that includes the historical outputs of the first model and/or historical outputs of other models that are similar to the first model (e.g., a same type of model and/or a model that is configured to perform the same task using a similar analysis system or data stream). Accordingly, the second historical data may be associated with a plurality of analysis systems that are configured to monitor the physical environment and/or a plurality of analysis systems that are configured to monitor other physical environments. In some implementations, based on a service identified in a service request, the second model may be trained to identify one or more parameters that are to be identified in connection with providing the service, as described elsewhere herein.

In some implementations, the application management system may provide instructions to the edge device to maintain training data associated with the analysis system for a training period. Correspondingly, the application management system may train the second model based on the training data after the training period. In this way, the application management system may train the second model to learn feature data that is associated with features identified by the analysis system and/or that are associated with the physical environment.

As shown in FIG. 1B, and by reference number 115, the edge device receives the data stream. For example, as shown, the edge device may receive a data stream from a first analysis system (shown as Analysis system 1). The edge device may receive the data stream based on the application management system configuring or instructing the edge device to access the data stream from the analysis system. In some implementations, the data stream is routed to the edge device (e.g., via the application management system and/or one or more other devices in the architecture). Additionally, or alternatively, the edge device may receive and/or access the data stream based on receiving a service request (e.g., from the user device and/or the management device).

As further shown in FIG. 1B, and by reference number 120, the edge device processes the data stream using the first model. The first model may be configured to identify and/or detect an event and/or object associated with providing a service. For example, the first model may be configured to identify an event that triggers providing the service. Such an event may include a vehicle entering the parking area, an individual leaving the vehicle (e.g., to start a billing time period for parking), an individual approaching the vehicle (e.g., to monitor the activity of the individual with respect to the vehicle), and/or the like. Additionally, or alternatively, the first model may be configured to identify an object associated with providing a service (e.g., a particular vehicle that is configured to automatically receive a particular service, such as one or more of the services described herein).

In some implementations, the edge device, using the first model, may process the data stream to identify an identifier of the vehicle (e.g., a license plate) and/or utilize the identifier to track the vehicle. Accordingly, as described herein, the edge device, using the first model, may detect that the vehicle has entered the physical environment, identify the vehicle (e.g., by identifying an identifier of the vehicle), and/or monitor the vehicle (e.g., monitor a location of the vehicle within the physical environment).

In some implementations, based on processing the data stream using the first model, the edge device may generate service data for providing the service. The service data may indicate that an object is associated with an occurrence of an event within the physical environment that triggers providing the service in association with the object. In some implementations, the service data may indicate and/or identify the service that is to be provided in association with an object (e.g., the vehicle) and/or an identifier of the object (e.g., the license plate number of the vehicle and/or account number associated with a user of the vehicle and/or user device).

As shown in FIG. 1B, the user device may be associated with a vehicle that enters and/or parks in the physical environment. For example, the user device may be associated with a driver (or passenger) of the vehicle. In some implementations, the user device may request that a service associated with the vehicle parking in the physical environment be provided. For example, such a service may include vehicle tracking or monitoring (e.g., for suspicious activity, which may be detected based on an individual being within a threshold distance of the vehicle for a particular period of time). Additionally, or alternatively, prior to parking, the user device may request the edge device to indicate or identify locations of available parking spaces in the area (e.g., available parking spaces that can accommodate the vehicle, based on the vehicle size, which can be mapped to the identifier of the vehicle via the account of the user).

As further shown in FIG. 1B, and by reference number 125, the edge device determines and/or provides service data for the second model. In some implementations, based on processing the data stream using the first model, the edge device may generate a processing request that indicates that the application management system (or another device) is to perform another task (e.g., a second task) in connection with providing the service. The processing request may be included within the service data to identify the service that is to be performed, to identify the vehicle, and/or to identify one or more detected events associated with the vehicle (e.g., one or more events associated with triggering the performance of the second task). Accordingly, the service data may include a notification of an event associated with providing the service in association with the vehicle.

Additionally, or alternatively, the service data may include a portion of the data stream that is to be processed using the second model. For example, the second model may be configured to process a video stream (or a portion of a video stream) in order to provide a service described herein. Additionally, or alternatively, the edge device, using the first model, may identify a subset of image data (or a subset of frames of a video stream) from the data stream that is to be analyzed in association with providing the service. As a more specific example, if the second model is to determine an occupancy of the vehicle (e.g., whether or not an individual is inside of the vehicle), the portion of the data stream may include images (or frames of a video stream) of the vehicle that are cropped from the data stream. In this way, the edge device may conserve network resources associated with providing the data stream (e.g., by only providing relevant portions of the data stream that are needed for the second model to perform the second task and/or provide the service, rather than the entire data stream). Additionally, or alternatively, the edge device, by providing the portion of the data stream (rather than the entire data stream) may permit the application management system to conserve resources associated with the second model processing the service data using the second model (e.g., because the second model would not have to process the entire data stream).

As shown in FIG. 1C, and by reference number 130, the application management system receives the service data. For example, the application management system may receive the service data based on the edge device causing the first model to generate the service data associated with providing the service for the vehicle in the physical environment.

The service data may include the processing request from the edge device (e.g., a processing request to perform a task associated with providing the service). The application management system may process the service data, using the API manager and/or the AI Engine, to determine which model, of a plurality of AI models associated with the application management system, are to be used to provide the service. The application management system may be configured to identify one or more AI models that are configured to perform tasks (e.g., tasks associated with one or more APIs of the application). Correspondingly, the application management system, based on processing the service data and/or identifying the service that is to be provided may select the second model for performing the second task of the service and/or providing the service as described elsewhere herein.

As further shown in FIG. 1C, and by reference number 135, the application management system processes the service data using the second model. For example, the application management system may use the second model to process the data stream (and/or a portion of the data stream provided in the service data) to perform a second task associated with providing the service, as described elsewhere herein. More specifically, the application management system may determine, using the second model, a status of the object based on the data stream and the processing request (e.g., based on the processing request identifying the type of service or characteristics of the vehicle and/or an identifier of the vehicle). Referring to the vehicle of FIG. 1B, the status may correspond to an occupancy of the vehicle, a location of the vehicle, whether the vehicle is associated with other objects (e.g., within a threshold distance of other vehicles or individuals) and/or the like.

In some implementations, the application management system may generate a service output that is associated with providing the service in association with the object. For example, based on the status of the vehicle, the application management system may generate a service output that indicates whether the vehicle is occupied (and/or that provides billing information associated with the vehicle being occupied, such as a vehicle parking fee) and/or that indicates whether an object is near the vehicle within the physical environment. As described herein, the application management system may perform one or more actions associated with providing the service in association with the object and/or an event of the physical environment.

As further shown in FIG. 1C, and by reference number 140, the application management system updates an edge model of the edge device. For example, as shown, the application management system may provide the edge device with the second model to permit the edge device to perform the second task in association with a subsequent service request and/or detection of an event that triggers providing the service. In this way, the application management system and/or the edge device may conserve network resources associated with the edge device requesting the application management system to perform the second task using the second model and/or may conserve computing resources of the application management system that would otherwise be used to perform the second task, thereby making resources of the application management system available to perform one or more other tasks (e.g., other tasks associated with other services involving other analysis systems, other edge devices, and/or other physical environments).

In some implementations, to update the one or more models of an edge device, the application management system may provide, to the edge device, training data associated with determining the status of the object. In this way, the application management system may cause the edge device to retrain the first model to include the second model based on the training data. Additionally, or alternatively, the application management system may cause the edge device to retrain the second model based on the training data and historical data (e.g., the first historical data) that is associated with the analysis system. In this way, the edge device may locally configure the second model according to locally learned feature data associated with the analysis system and/or the physical environment.

As further shown in FIG. 1C, and by reference number 145, the edge device and/or the application management system provides a service output to the user device and/or the management device. For example, the service output may indicate a status of the vehicle determined by the application management system performing the second task, as described above. In this way, the application management system may permit the user device that requested the service to permit the user of the user device to access the service output (and/or determine the status of the vehicle).

In some implementations, the application management system may cause the analysis system to indicate, via a user interface of the analysis system, the service output. For example, the application management system may cause an alarm system to alert the status of a vehicle (e.g., to alert individuals in the area of suspicious activity associated with a status of the vehicle, such as a potentially malicious actor being near the vehicle for a threshold period of time).

Accordingly, as described herein, a system may include an application management system and multiple edge devices (e.g., at least a first edge device and a second edge device), and one or more analysis systems for monitoring a physical environment (e.g., a physical environment associated with a smart city infrastructure). For example, the first edge device may receive first real-time data (e.g., from a first analysis system) and transmit the first real-time data to the application management system. The application management system may process, using a first AI model, the first real-time data to generate first output data. Further, the second edge device may receive second real-time data, process, using a second AI model, the second real-time data to generate second output data, and transmit the second output data to the application management system. Accordingly, the application management system may perform an action based on the first output data and/or the second output data, as described herein.

In this way, as described herein, the application management system, as described herein, may selectively deploy and/or integrate one or more AI models in order to robustly and accurately provide a service associated with monitoring a physical environment using an analysis system. Accordingly, the application management system may conserve computing resources (e.g., processor resources and/or memory resources of edge devices and/or the application management system) and/or network resources (e.g., of a network architecture associated with the edge device, the application management system, and/or the analysis system) that would be wasted using other systems or other AI model deployment configurations. Furthermore, implementations described herein use a rigorous, scalable computerized approach (e.g., in association with and/or for hundreds or thousands of services associated with analysis systems and/or in association with hundreds, thousands, or more physical environments) to perform processes (e.g., simultaneously for multiple services and/or for analysis systems of multiple environments). Furthermore, a process for integrating and/or deploying AI models in association with performing a service, as described herein, conserves computing resources (e.g., processor resources, memory resources, and/or the like) that would otherwise be wasted in attempting to individually and/or separately integrate and/or deploy AI models for separate services and/or different physical environments.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
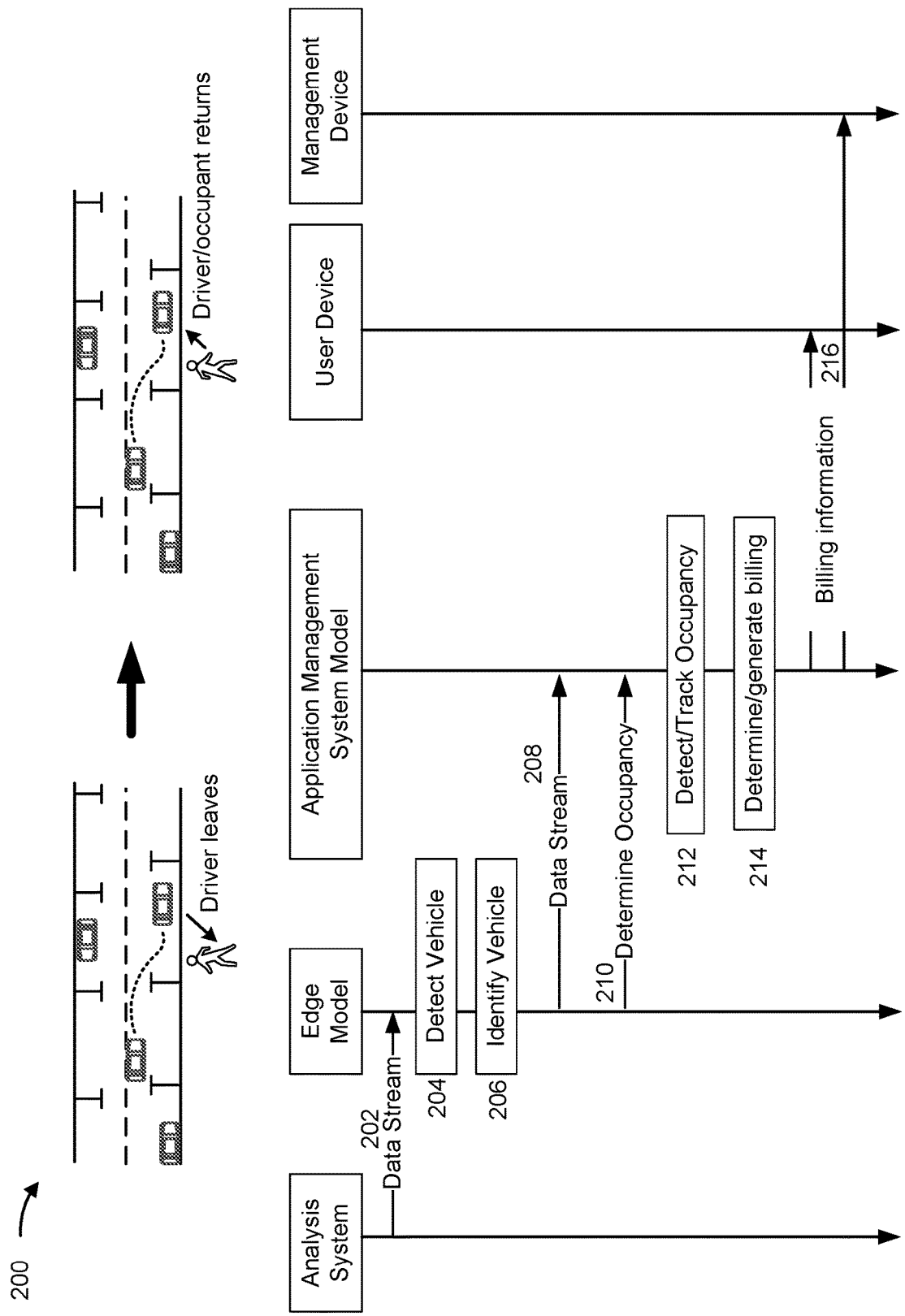
FIGS. 2-4 are example call flows associated with one or more example implementations described herein.
Figure 3:
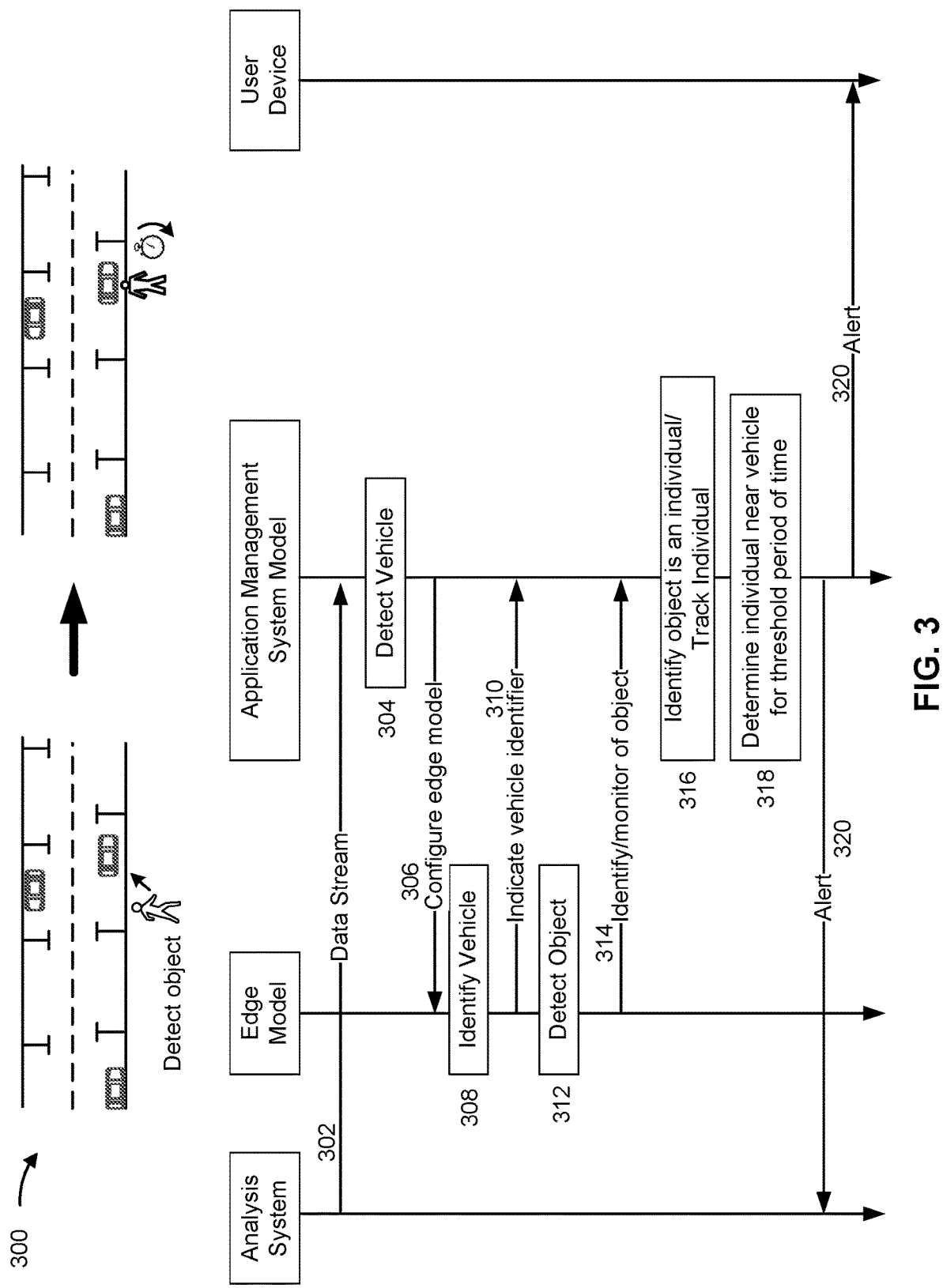
Figure 4:
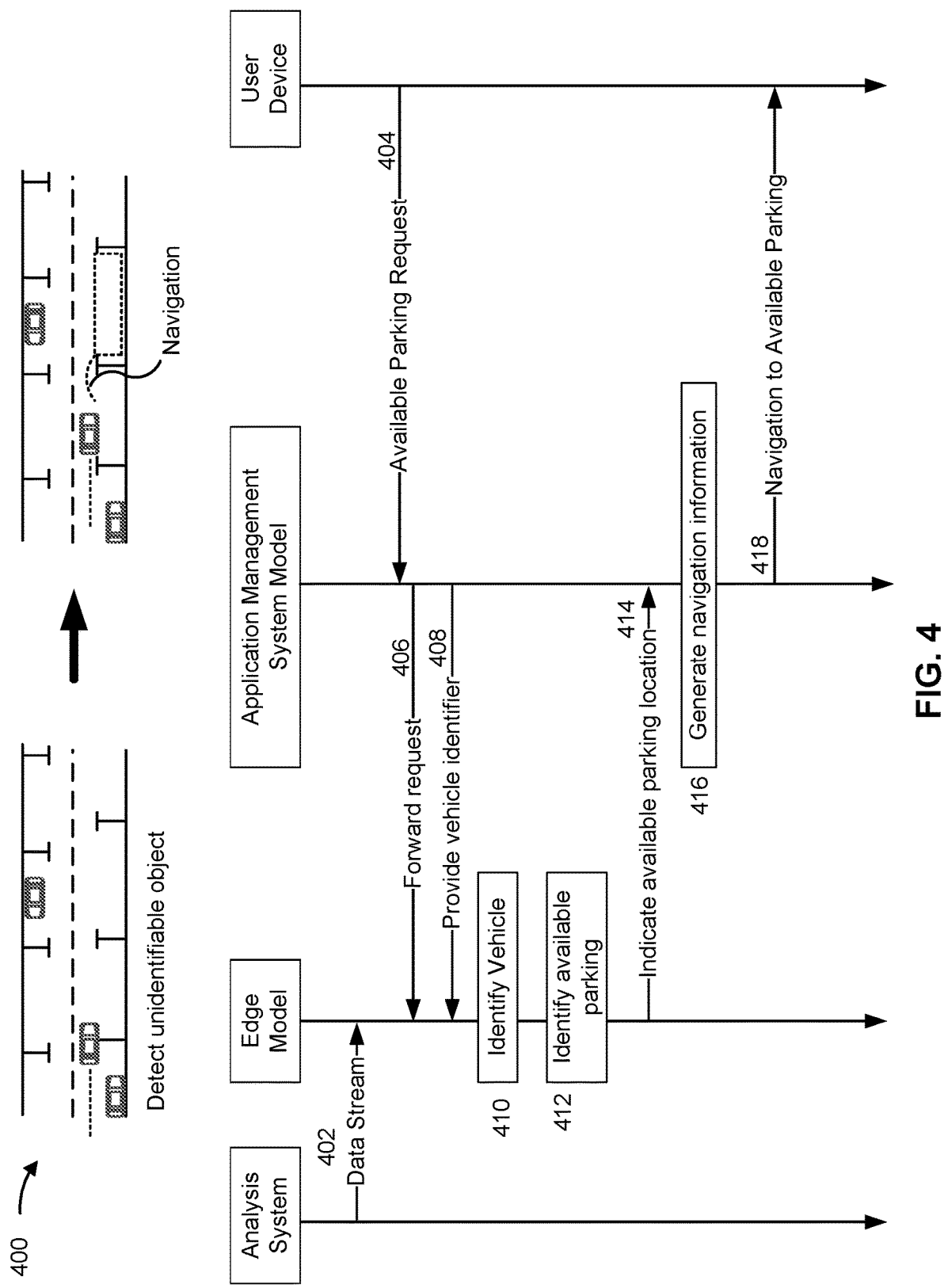

FIGS. 2-4 are diagrams of example implementations associated with providing a service in according to one or more processes associated with AI model integration and/or deployment described herein. FIGS. 2-4 include call flow diagrams associated with example scenarios involving a vehicle in a physical environment and/or one or more devices or models, described herein (e.g., in connection with FIGS. 1A-1C and/or FIG. 5).

In FIG. 2, an example implementation 200 includes an analysis system, an edge model (e.g., a model hosted by an edge device of example implementation 100), an application management system model (e.g., an AI model hosted by the application management system of example implementation 100), a user device, and a management device. Example implementation 200 involves an example of providing a service associated with tracking an occupancy of a vehicle (e.g., in order to provide a billing for a service associated with parking of the vehicle).

In example implementation 200, the edge model receives a data stream from the analysis system (202). The edge model may detect the vehicle (204) and identify the vehicle (206) (e.g., identify a license plate number of the vehicle). The edge model may provide the data stream (or a portion of the data stream that includes the vehicle) to the application management system model (208). For example, the edge model may provide the data stream in service data that identifies the vehicle. The edge model may send a processing request to instruct the application management system model to determine the occupancy of the vehicle (210).

The application management system model, based on receiving the processing request, may process the data stream to detect and/or track the occupancy of the vehicle (212). The application management system model may determine and/or generate billing information according to the occupancy of the vehicle (214) (e.g., based on timing associated with the vehicle being in a parking space and unoccupied). The application management system model may provide billing information to the user device (e.g., based on an account associated with a user of the user device being associated with the identified vehicle) and/or the management device (216).

In FIG. 3, an example implementation 300 includes an analysis system, an edge model, an application management system model, and a user device. Example implementation 300 involves an example of providing a service associated with monitoring an area of a vehicle for another object (e.g., in order to detect suspicious activity associated with potential malicious activity involving the vehicle).

In example implementation 300, the application management system model receives a data stream from the analysis system (302). The application management system model may detect a vehicle (304). The application management system model may configure (e.g., based on detecting the vehicle) the edge model to identify the vehicle (306). The edge model may identify the vehicle (308). The edge model may indicate the vehicle identifier to the application management system model (310). The edge model may detect an object (e.g., an unknown object) near the vehicle (312). The edge model may send a processing request to the application management system model to identify and/or monitor the object (314).

The application management system model may identify the object as an individual (e.g., using an AI model configured to identify an individual) and/or track the individual (316) (e.g., tracking the location of the individual relative to the location of the vehicle). The application management system model may determine that the individual is near the vehicle (e.g., within a threshold distance of the vehicle) for a threshold period of time (318) (e.g., a duration of time suggesting potential suspicious activity involving the individual and the vehicle). The application management system model may provide a service output as an alert to the analysis system (e.g., to cause the analysis system to alert individuals in the physical environment of potential suspicious activity involving the vehicle) and/or to the user device (320) (e.g., to alert a user associated with the vehicle of potential suspicious activity involving the vehicle).

In FIG. 4, an example implementation 400 includes an analysis system, an edge model, an application management system model, and a user device. Example implementation 400 involves an example of providing a service associated with determining and/or indicating available parking in a physical environment.

In example implementation 400, the edge model receives a data stream from the analysis system (402). The application management system model receives, from the user device, a service request to indicate available parking (404). The application management system model forwards the request to the edge model (406). The application management system model provides a vehicle identifier associated with the request (408). For example, the application management system model may provide a license plate number determined based on a mapping of the user device and/or an account of the user device to the license plate number.

The edge model identifies the vehicle (410) (e.g., based on the identifier). The edge model identifies available parking for the vehicle (412) (e.g., based on identified unoccupied parking spaces in the physical environment that may accommodate the vehicle). The edge model indicates the available parking location (414). The application management system model generates navigation information (416) (e.g., based on locations of the vehicle and the location of the available parking space). The application management system model provides navigation information to the available parking space (or location of the parking space) to the user device (418). In some implementations, the edge model and/or the application management system may determine and/or identify a parking space that is nearest the vehicle, a parking space that is large enough to permit the vehicle to fit in the parking space, a parking space that is optimally sized to fit the vehicle (e.g., a compact parking space may be suggested for a compact vehicle to maintain availability of larger spaces for larger vehicles), among other examples.

In some implementations, if the edge model determines that all parking spaces are occupied, the edge model (or the application management system) may estimate a time at which one or more of the parking spaces may be available (e.g., based on billing information associated with vehicles occupying the parking spaces and/or based on a duration of time from when an occupant left the vehicle, among other examples). Correspondingly, the edge device may determine and/or indicate (e.g., to the application management system and/or via a user interface in the physical environment) an estimated wait time for a parking space in the physical environment (e.g., an estimate duration of time until one or more of the parking spaces are available). In this way, the edge device enables the application management system to learn or identify that the parking spaces are occupied in the physical environment (e.g., to perform one or more actions, such as provide information associated with another physical environment or information from another edge device that indicates parking availability). Furthermore, the edge device, via a user interface, may permit an operator or occupant of a waiting vehicle in the physical environment to be aware of the estimated wait time.

In some implementations, the application management system may monitor the navigation of the vehicle to determine whether the vehicle parks in the suggested and/or recommended parking space. For example, if the application management system later determines (e.g., via an analysis of vehicles parked in occupied spaces) that the vehicle parked in the suggested parking space (e.g., based on identifying the license plate provided by the user device matches the license plate of the vehicle that actually parked in the parking space), the application management system may provide a confirmation notification or message to the management device. In such a case, the application management system and/or the management device may issue a benefit (e.g., a billing discount or rating increase) to an account associated with the user device.

Additionally, or alternatively, the application management system may monitor the parking space after the navigation information and/or location of the parking space is provided to the user device to determine whether another vehicle parked in the parking space before the vehicle identified by the license plate reached the parking space. In such a case, the application management system may provide a notification that the parking space is no longer available and/or determine and provide navigation information for another parking space as described above.

In this way, the edge model and/or application management system model may be configured to provide one or more services according to one or more processes described herein.

As indicated above, FIGS. 2-4 are provided as an example. Other examples may differ from what is described with regard to FIGS. 2-4. The number and arrangement of devices shown in FIGS. 2-4 are provided as an example. In practice, there may be additional devices, fewer devices, different devices, or differently arranged devices than those shown in FIGS. 2-4. Furthermore, two or more devices shown in FIGS. 2-4 may be implemented within a single device, or a single device shown in FIGS. 2-4 may be implemented as multiple, distributed devices. Additionally, or alternatively, a set of devices (e.g., one or more devices) shown in FIGS. 2-4 may perform one or more functions described as being performed by another set of devices shown in FIGS. 2-4.

Figure 5:
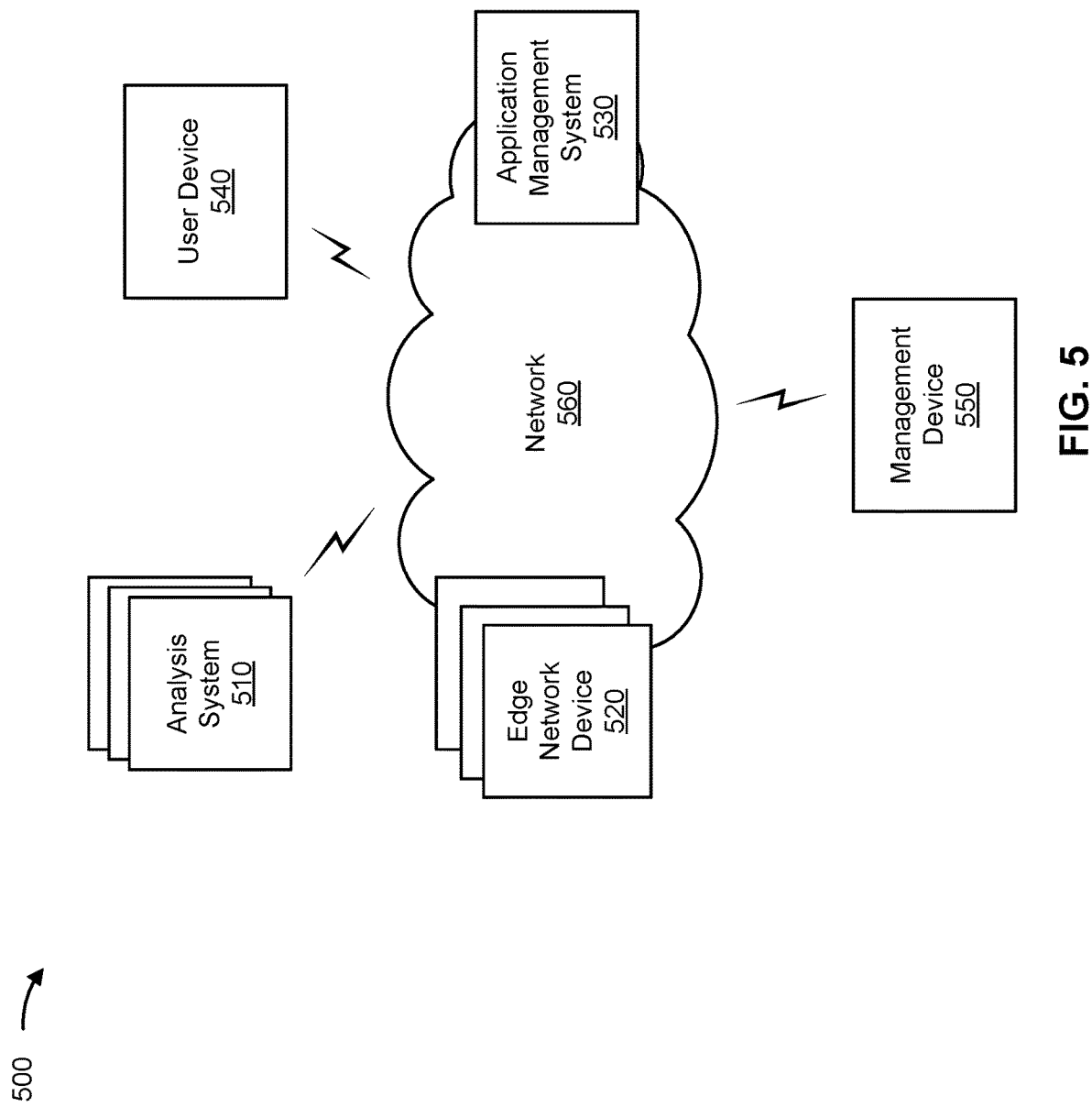
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include an analysis system 510, one or more edge devices 520, an application management system 530, a user device 540, a management device 550, and a network 560. Devices of environment 500 may interconnect via wired connections, wireless connections, or a combination of wired and wireless connections.

The analysis system 510 includes one or more devices capable of receiving, processing, storing, and/or providing information associated with monitoring a physical environment as described herein. For example, the analysis system 510 may include one or more sensors, such as a camera, a location sensor (e.g., a global positioning system (GPS) receiver, a local positioning system (LPS) device (e.g., that uses triangulation, multi-lateration, etc.), and/or the like), a speed sensor, a motion sensor, an infrared sensor, a temperature sensor, a pressure sensor, and/or or the like.

The edge device 520 includes one or more devices capable of receiving, processing, storing, routing, and/or providing traffic (e.g., a packet and/or other information or metadata) in a manner described herein. For example, the edge device 520 may include a router, such as a label switching router (LSR), a label edge router (LER), an ingress router, an egress router, a provider router (e.g., a provider edge router or a provider core router), a virtual router, or another type of router. Additionally, or alternatively, the edge device 520 may include a gateway, a switch, a firewall, a hub, a bridge, a reverse proxy, a server (e.g., a proxy server, a cloud server, or a data center server), a load balancer, and/or a similar device. In some implementations, the edge device 520 may be a physical device implemented within a housing, such as a chassis. In some implementations, the edge device 520 may be a virtual device implemented by one or more computing devices of a cloud computing environment or a data center. In some implementations, a group of edge devices 520 may be a group of data center nodes that are used to route traffic flow through a network.

The application management system 530 includes one or more devices capable of receiving, generating, storing, processing, providing, and/or routing information associated with integrating and/or deploying one or more artificial intelligence models to provide a service, as described elsewhere herein. The application management system 530 may include a communication device and/or a computing device. For example, the application management system 530 may include a server, such as an application server, a client server, a web server, a database server, a host server, a proxy server, a virtual server (e.g., executing on computing hardware), or a server in a cloud computing system. In some implementations, the application management system 530 includes computing hardware used in a cloud computing environment.

The user device 540 may include one or more devices capable of receiving, generating, storing, processing, and/or providing information associated with a service provided in association with one or processes for integrating and/or deploying an AI model, as described elsewhere herein. The user device 540 may include a communication device and/or a computing device. For example, the user device 540 may include a wireless communication device, a mobile phone, a user equipment, a laptop computer, a tablet computer, a desktop computer, wearable communication device (e.g., a smart wristwatch, a pair of smart eyeglasses, a head mounted display, or a virtual reality headset), or a similar type of device.

The management device 550 may include one or more devices capable of receiving, generating, storing, processing, and/or providing information associated with providing a service in association with one or processes for integrating and/or deploying an AI model, as described elsewhere herein. The management device 550 may include a communication device and/or a computing device. For example, the management device 550 may include a wireless communication device, a mobile phone, a user equipment, a laptop computer, a tablet computer, a desktop computer, wearable communication device (e.g., a smart wristwatch, a pair of smart eyeglasses, a head mounted display, or a virtual reality headset), or a similar type of device.

The network 560 includes one or more wired and/or wireless networks. For example, the network 560 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 560 enables communication among the devices of environment 500.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
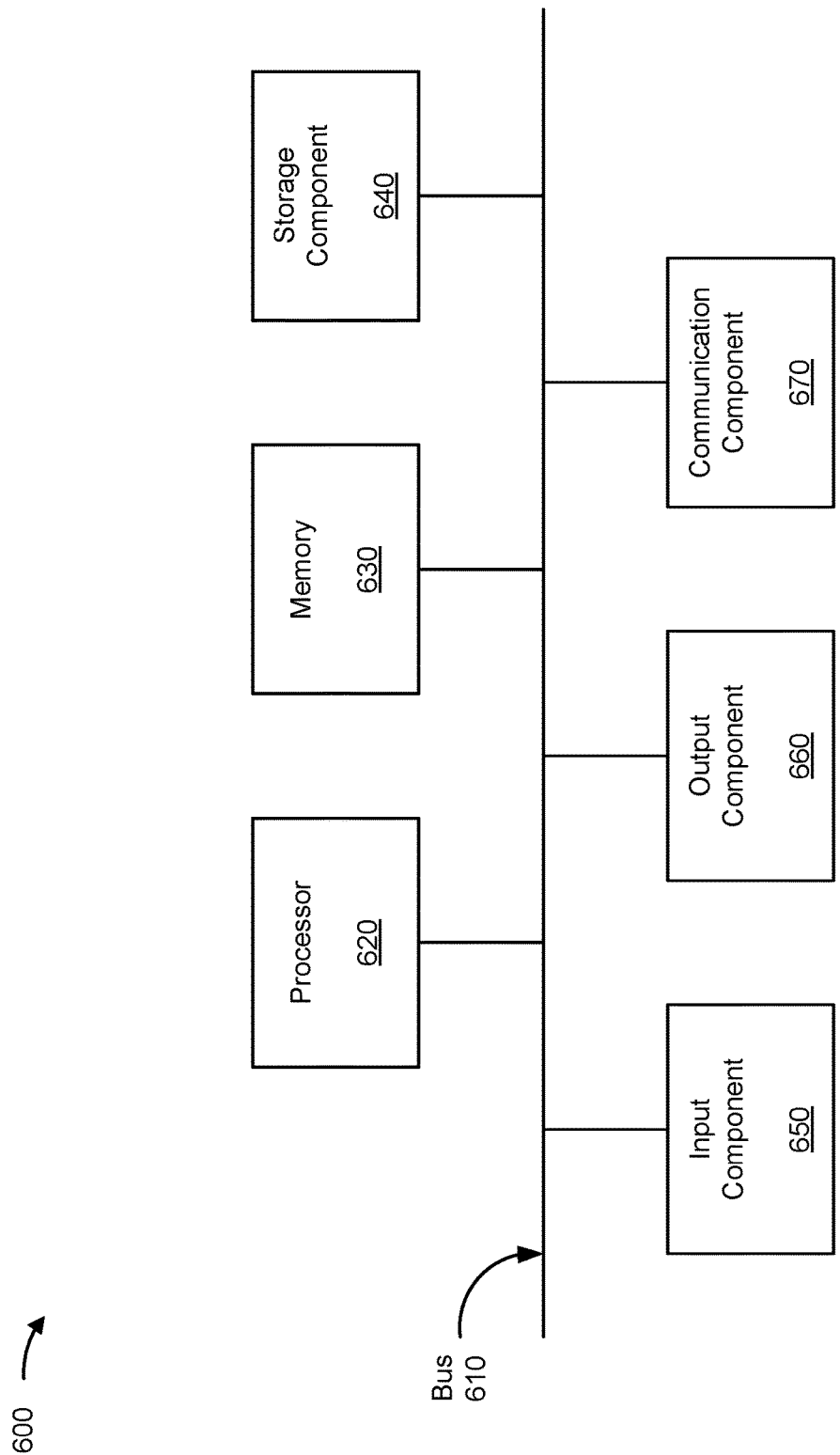
FIG. 6 is a diagram of example components of one or more devices of FIG. 5.

FIG. 6 is a diagram of example components of a device 600, which may correspond to the analysis system 510, the edge device 520, the application management system 530, the user device 540, and/or the management device 550. In some implementations, the analysis system 510, the edge device 520, the application management system 530, the user device 540, and/or the management device 550 may include one or more devices 600 and/or one or more components of device 600. As shown in FIG. 6, device 600 may include a bus 610, a processor 620, a memory 630, a storage component 640, an input component 650, an output component 660, and a communication component 670.

Bus 610 includes a component that enables wired and/or wireless communication among the components of device 600. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform a function. Memory 630 includes a random access memory, a read only memory, and/or another type of memory (e.g., a flash memory, a magnetic memory, and/or an optical memory).

Storage component 640 stores information and/or software related to the operation of device 600. For example, storage component 640 may include a hard disk drive, a magnetic disk drive, an optical disk drive, a solid state disk drive, a compact disc, a digital versatile disc, and/or another type of non-transitory computer-readable medium. Input component 650 enables device 600 to receive input, such as user input and/or sensed inputs. For example, input component 650 may include a touch screen, a keyboard, a keypad, a mouse, a button, a microphone, a switch, a sensor, a global positioning system component, an accelerometer, a gyroscope, and/or an actuator. Output component 660 enables device 600 to provide output, such as via a display, a speaker, and/or one or more light-emitting diodes. Communication component 670 enables device 600 to communicate with other devices, such as via a wired connection and/or a wireless connection. For example, communication component 670 may include a receiver, a transmitter, a transceiver, a modem, a network interface card, and/or an antenna.

Device 600 may perform one or more processes described herein. For example, a non-transitory computer-readable medium (e.g., memory 630 and/or storage component 640) may store a set of instructions (e.g., one or more instructions, code, software code, and/or program code) for execution by processor 620. Processor 620 may execute the set of instructions to perform one or more processes described herein. In some implementations, execution of the set of instructions, by one or more processors 620, causes the one or more processors 620 and/or the device 600 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
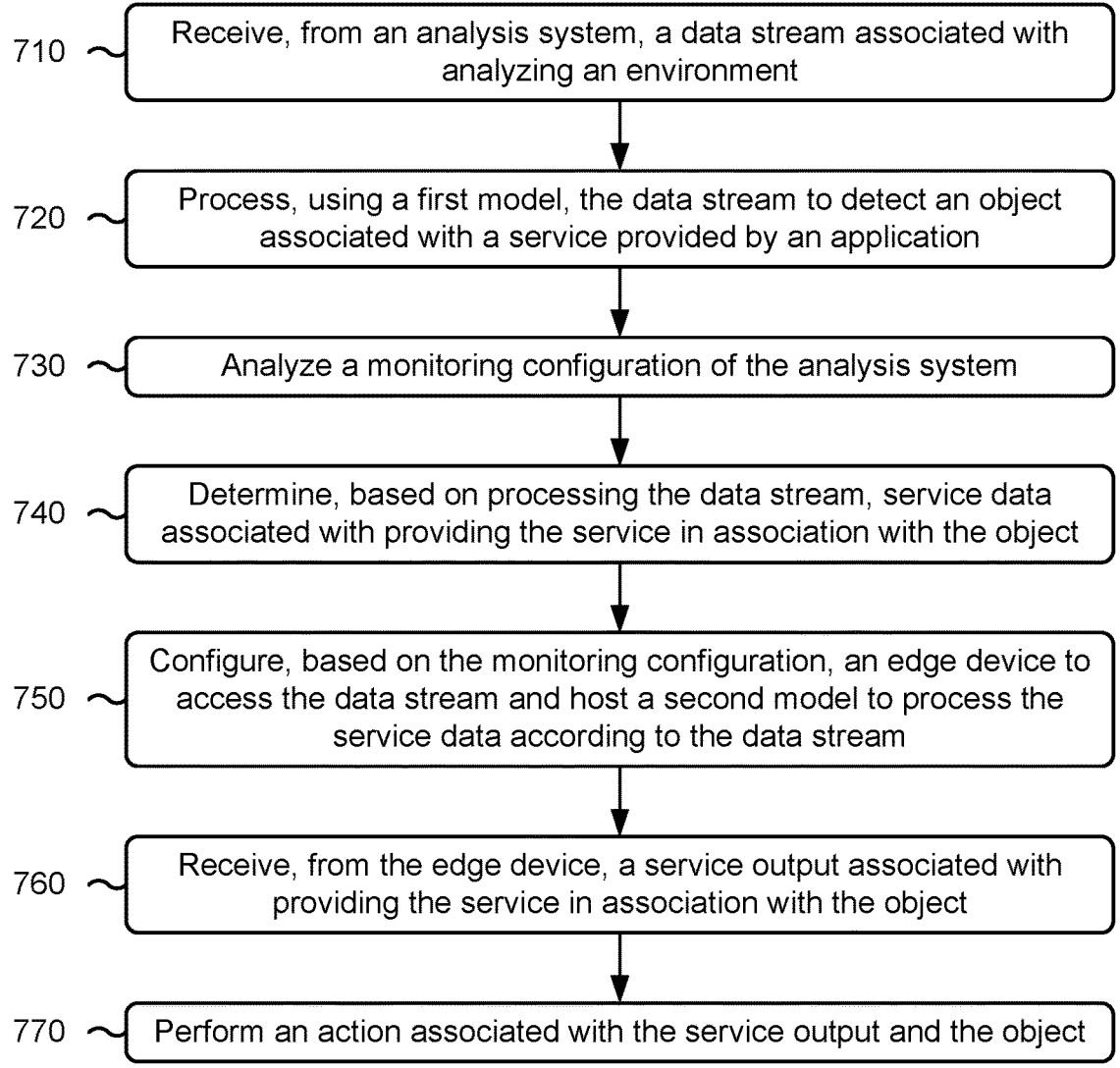
FIG. 7 is a flowchart of an example process relating to integrating and/or deploying one or more artificial intelligence models to provide a service.

FIG. 7 is a flowchart of an example process 700 associated with artificial intelligence model integration and deployment for providing a service. In some implementations, one or more process blocks of FIG. 7 may be performed by an application management system (e.g., the application management system 530). In some implementations, one or more process blocks of FIG. 7 may be performed by another device or a group of devices separate from or including the application management system, such as an analysis system (e.g., the analysis system 510), an edge device (e.g., the edge device 520), a user device (e.g., the user device 540), and/or a management device (e.g., the management device 550). Additionally, or alternatively, one or more process blocks of FIG. 7 may be performed by one or more components of device 600, such as processor 620, memory 630, storage component 640, input component 650, output component 660, and/or communication component 670.

As shown in FIG. 7, process 700 may include receiving, from an analysis system, a data stream associated with monitoring a physical environment (block 710). For example, the application management system may receive, from an analysis system, a data stream associated with monitoring a physical environment, as described above.

As further shown in FIG. 7, process 700 may include processing, using a first model, the data stream to detect an object associated with a service provided by an application (block 720). For example, the application management system may process, using a first model, the data stream to detect an object associated with a service provided by an application, as described above. The service may be identified in a service request received from a user device.

The object may be a vehicle, and the service may be associated with tracking an occupancy of the vehicle, monitoring an area of the physical environment that includes the vehicle for another object, and/or indicating an available parking location, within the physical environment, that accommodates the vehicle.

As further shown in FIG. 7, process 700 may include analyzing a monitoring configuration of the analysis system (block 730). For example, the application management system may analyze a monitoring configuration of the analysis system, as described above.

As further shown in FIG. 7, process 700 may include determining, based on processing the data stream, service data associated with providing the service in association with the object (block 740). For example, the application management system may determine, based on processing the data stream, service data associated with providing the service in association with the object, as described above.

As further shown in FIG. 7, process 700 may include configuring, based on the monitoring configuration, an edge device to access the data stream and host a second model to process the service data according to the data stream (block 750). For example, the application management system may configure, based on the monitoring configuration, an edge device to access the data stream and host a second model to process the service data according to the data stream, as described above. The edge device may be selected, from a plurality of edge devices, based on a location of the analysis system or a location of the user device.

In some implementations, the application management system may provide instructions to the edge device to maintain training data associated with the analysis system for a training period and training the second model based on the training data after the training period.

As further shown in FIG. 7, process 700 may include receiving, from the edge device, a service output associated with providing the service in association with the object (block 760). For example, the application management system may receive, from the edge device, a service output associated with providing the service in association with the object, as described above.

As further shown in FIG. 7, process 700 may include performing an action associated with the service output and the object (block 770). For example, the application management system may perform an action associated with the service output and the object, as described above.

In some implementations, the application management system may provide the service output to a user device that requested the service to permit a user of the user device to access the service output. Additionally, or alternatively, the application management system may cause the analysis system to indicate, via a user interface of the analysis system, the service output.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A method, comprising:
receiving, by an edge device and from an analysis system, a data stream including image data, audio data, location data, sensed environment data, or weather data based on monitoring an environment,
wherein the environment is a physical environment;
processing, by the edge device and using a first model, the data stream to detect an object,
wherein the edge device is selected to host the first model based on one or more locations of devices of the analysis system relative to the edge device, and
wherein the first model is trained according to first historical data,
wherein the first model is a first artificial intelligence model, and
wherein processing the data stream to detect the object comprises:
identifying an event that triggers providing a service, and
identifying the object based on identifying the event;
training, by an application management system, a second model, including a second artificial intelligence model, based on historical outputs determined by the first model and based on second historical data identifying historical services;
determining, by the edge device and based on processing the data stream, service data that identifies the service to be performed on the object;
providing, by the edge device and to the application management system, a processing request to process the service data using the second model, wherein the edge device provides a portion of the data stream to the application management system for the second model,
   wherein the edge device determines the portion of the data stream based on identifying a subset of image data from the data stream depicting the object used in the service;
determining, by the application management system and using the second model, a status of the object based on detection of complex features of the object depicted in the data stream;
receiving, by the edge device and from the application management system, a service output based on the status of the object,
   wherein the service output is based on the application management system processing the portion of the data stream using the second model;
providing, by the application management system and to the edge device, training data associated with determining the status of the object to update the second model;
retraining, by the edge device, the second model based on training data and the first historical data; and
performing, by the edge device, an action associated with the service output and the object in association with the physical environment.

2. The method of claim 1, wherein the service is identified in a service request received from a user device,
   wherein the data stream is processed based on receiving the service request.

3. The method of claim 1, wherein the data stream includes a video stream from a camera of the analysis system, and
   wherein the first model is configured to identify an identifier of the object in the video stream,
      wherein the service data indicates the identifier, and
      wherein the service is provided in association with an account that is mapped to the identifier and that is associated with a user of the object.

4. The method of claim 1, wherein the service data comprises at least one of:
   a notification of the event; or
   the portion of the data stream that is to be processed using the second model.

5. The method of claim 1, wherein the object is a vehicle and the service is associated with at least one of:
   tracking an occupancy of the vehicle;
   monitoring an area of the environment that includes the vehicle for another object; or
   indicating an available parking location, within the environment, that accommodates the vehicle.

6. The method of claim 1, wherein the second historical data is associated with a plurality of analysis systems that are configured to monitor the environment,
   wherein the analysis system is one of the plurality of analysis systems.

7. The method of claim 1, wherein performing the action comprises at least one of:
   providing the service output to a user device that requested the service to permit a user of the user device to access the service output; or
   causing the analysis system to indicate, via a user interface of the analysis system, the service output.

8. A device, comprising:
one or more memories; and
one or more processors, communicatively coupled to the one or more memories, configured to:
   receive a service request to provide a service in an environment,
      wherein the environment is a physical environment;
   analyze a monitoring configuration of an analysis system that monitors the environment and that provides a data stream including image data, audio data, location data, sensed environment data, or weather data depicting an event that triggers the service;
   determine a first set of parameters for performing a first task associated with providing the service;
   select, based on the first set of parameters and the monitoring configuration, a first device to host a first model that is configured to perform the first task based on a first portion of the data stream,
      wherein the first model is a first artificial intelligence model trained on first historical data;
   cause the first device to host the first model and access the data stream,
      wherein the first device is configured to process the first portion of the data stream using the first model, and
      wherein the first device, to process the first portion of the data stream, is configured to:
         identify the event that triggers providing the service, and
         identify an object based on identifying the event;
   determine a second set of parameters for performing a second task;
   train a second model, including a second artificial intelligence model, based on historical outputs determined by the first model and based on second historical data identifying historical services;
   configure, based on the second set of parameters and the monitoring configuration, the second model to perform the second task,
      wherein the second model is hosted on a separate device from the first device;
   determine, using the second model, a status of the object based on detection of complex features of the object depicted in the data stream;
   obtain training data associated with determining the status of the object to update the second model;
   retrain the second model based on training data and the first historical data;
   access, from the analysis system, the data stream; and
   perform an action associated with providing the service based on service data, that identifies the service to be performed on the object, received from the first model or the data stream in association with the physical environment.

9. The device of claim 8, wherein the first model is trained to detect the event, and
wherein the second model is trained to process the service data to determine the status of the object in association with providing the service.

10. The device of claim 9, wherein the object is a vehicle, wherein the first model is configured to identify the vehicle based on an identifier depicted in a video stream of the data stream, and wherein the second model is configured to process the video stream in order to at least one of:
track an occupancy of the vehicle;
detect another object in an area of the environment that includes the vehicle; or
identify an available parking location, within the environment, that accommodates the vehicle.

11. The device of claim 8, wherein the first historical data is generated based on the analysis system monitoring the environment.

12. The device of claim 11, wherein the second historical data is associated with a plurality of analysis systems that are configured to monitor a plurality of environments,
wherein the analysis system is one of the plurality of analysis systems.

13. The device of claim 8, wherein the one or more processors are configured to, when performing the action:
identify, from the service data, a processing request in association with the object in the environment,
wherein the service data indicates that the object is associated with an occurrence of the event within the environment;
determine, using the second model, the status of the object based on the data stream and the processing request;
generate, based on the status of the object, a service output that is associated with providing the service in association with the object; and
provide the service output to another device that provided the service request.

14. The device of claim 8, wherein the one or more processors are configured to, when performing the action:
identify, from the service data, a processing request in association with the object in the environment,
wherein the service data indicates that the object is associated with an occurrence of the event within the environment;
determine, using the second model, the status of the object based on the data stream and the processing request; and
provide, to the first device, training data associated with determining the status of the object to cause the first device to train the first model based on the training data.

15. A non-transitory computer-readable medium storing a set of instructions, the set of instructions comprising:
one or more instructions that, when executed by one or more processors of a device, cause the device to:
receive, from an analysis system, a data stream including image data, audio data, location data, sensed environment data, or weather data based on monitoring an environment,
wherein the environment is a physical environment;
process, using a first model, the data stream to detect an object used in a service provided by an application,
wherein the device is selected to host the first model based on one or more locations of devices of the analysis system relative to the device,
wherein the first model is a first artificial intelligence model trained based on first historical data, and
wherein the one or more instructions, that cause the device to process the data stream to detect the object, cause the device to:
identify an event that triggers providing the service, and
identify the object based on identifying the event;
analyze a monitoring configuration of the analysis system;
determine, based on processing the data stream, service data that identifies the service to be performed on the object;
train a second model, including a second artificial intelligence model, based on historical outputs determined by the first model and based on second historical data identifying historical services;
configure, based on the monitoring configuration, an edge device to access the data stream and host the second model to process the service data according to the data stream,
wherein the edge device is selected to host the second model based on the one or more locations of the devices of the analysis system relative to the edge device;
determine, using the second model, a status of the object based on detection of complex features of the object depicted in the data stream;
receive, from the edge device, a service output based on the status of the object,
wherein the edge device provides a portion of the data stream to the device;
provide, to the edge device, training data associated with determining the status of the object to update the second model;
cause the edge device to retrain the second model based on training data and the first historical data; and
perform an action associated with the service output and the object in association with the physical environment.

16. The non-transitory computer-readable medium of claim 15, wherein the service is identified in a service request received from a user device.

17. The non-transitory computer-readable medium of claim 16, wherein the edge device is selected, from a plurality of edge devices, based on a location of the analysis system or a location of the user device.

18. The non-transitory computer-readable medium of claim 15, wherein the object is a vehicle and the service is associated with at least one of:
tracking an occupancy of the vehicle;
monitoring an area of the environment that includes the vehicle for another object; or
indicating an available parking location, within the environment, that accommodates the vehicle.

19. The non-transitory computer-readable medium of claim 15, wherein the one or more instructions, that cause the device to configure the edge device to host the second model, cause the device to:
provide instructions to the edge device to maintain training data associated with the analysis system for a training period; and
train the second model based on the training data after the training period.

20. The non-transitory computer-readable medium of claim 15, wherein the one or more instructions, that cause the device to perform the action, cause the device to:
provide the service output to a user device that requested the service to permit a user of the user device to access the service output; or
cause the analysis system to indicate, via a user interface of the analysis system, the service output.

21. A system for monitoring a physical environment, the system comprising:
an application management system;
a first edge device configured to:
receive first real-time data, and
transmit a portion of the first real-time data to the application management system,
wherein the application management system is configured to process the portion of first real-time data using a first artificial intelligence (AI) model to generate first output data based on:
identifying an event that trigger providing a service, and
identifying an object based on identifying the event, and
wherein the first AI model is trained according to first historical data; and
a second edge device configured to:
train a second AI model, based on historical outputs determined by the first AI model and based on second historical data identifying historical services,
receive a second real-time data,
process, using the second AI model, the second real-time data to generate second output data,
wherein the second edge device is selected to host the second AI model based on one or more locations of camera relative to the second edge device,
determine, using the second AI model, a status of the object based on detection of complex features of the object,
obtain training data associated with determining the status of the object to update the second AI model,
retrain the second AI model based on training data and the first historical data; and
transmit the second output data to the application management system,
wherein the application management system is configured to perform an action based on the first output data or the second output data.

22. The system of claim 21, wherein the first real-time data or the second real-time data include at least one of:
image data,
video data,
audio data,
location data,
sensed environment data, or
weather data.

23. The system of claim 21, wherein at least one of:
the first real-time data is stored at a central server, or
the second real-time data is stored at the second edge device.

24. The system of claim 21, wherein the first output data or the second output data include at least one of:
a license plate number,
a vehicle parking fee,
navigation information to an available parking space, or
an estimated wait time for a parking space.

25. The system of claim 21, wherein the second edge device transmits the second output data to the application management system via at least one of:
a private cloud network, or
an edge gateway network.

26. The system of claim 21, wherein the first output data or the second output data are configured to be indicated via a user interface.

27. The system of claim 21, wherein the system is configured to monitor a smart city infrastructure that is associated with the first edge device and the second edge device.

* * * * *